Patented Dec. 14, 1948

2,456,582

UNITED STATES PATENT OFFICE 2,456,582

PROCESS FOR SEPARATION OF ISOMERIC XYLENOLS

Francis E. Cislak and Merritt M. Otto, Indianapolis, Ind., assignors to Reilly Tar & Chemical Corporation, Indianapolis, Ind., a corporation of Indiana No Drawing. Application August 20, 1945, Serial No. 611,695

8 Claims. (Cl. 260—619)

Our invention relates to the separation of 1,3,4 - xylenol (1,3 - dimethyl-4-hydroxybenzene) from mixtures containing 1,3,4-xylenol and 1,4,2-xylenol (1,4-dimethyl - 2 - hydroxybenzene) with the 1,3,4-xylenol predominating.

It is the object of our present invention to obtain the individual 1,3,4-xylenol; and to obtain the new compound metacresol-1,3,4-xylenol.

A mixture of 1,3,4-xylenol and 1,4,2-xylenol, associated with various other phenolic bodies, is obtained in the processing of coal tar and of petroleum oils. The other phenolic bodies commonly present, including paraethylphenol, can be separated quite readily and fairly completely from the mixture of 1,3,4-xylenol and 1,4,2-xylenol by fractional distillation. But the boiling points of the 1,3,4-xylenol and the 1,4,2-xylenol are so close together that it is not commercially practical to separate them by fractional distillation.

We have found that by treating with metacresol a mixture of 1,3,4-xylenol and 1,4,2-xylenol containing at least 55% 1,3,4-xylenol, whether or not the mixture also contains small amounts of higher and/or lower related phenolic bodies (such as the cresols and paraethylphenol), and cooling, either before and/or after and/or during the mixing, we get a formation of crystals of metacresol-1,3,4-xylenol, an addition product of some character composed of one molecule of metacresol and one molecule of 1,3,4-xylenol. The cooling is desirably to a temperature at least as low is 0° C., but rarely needs to be below −10° C. These crystals can readily be recovered, as by decanting or filtering; and can readily be reconverted into substantially pure metacresol and substantially pure 1,3,4-xylenol, as by fractional distillation.

Upon the recovery of the crystals of metacresol-1,3,4-xylenol by the decanting or filtering above referred to, the mother liquor remaining is much enriched in 1,4,2-xylenol, in comparison with the original 1,3,4-xylenol-1,4,2-xylenol mixture; and also contains considerable metacresol and some 1,3,4-xylenol. This mother liquor may be used as a source of 1,4,2-xylenol, as by the procedure set forth hereinafter. The metacresol is recovered from the mother liquor by fractional distillation and the residue remaining from the fractional distillation after the recovery of the metacresol is diluted with about 10% to 50% of a petroleum naphtha and then cooled to about 0° C. to −10° C. to obtain crystals of 1,4,2-xylenol. These crystals of 1,4,2-xylenol are separated, as by filtration.

The metacresol-1,3,4 - xylenol recovered as aforesaid is a new compound and is claimed as such in our copending application Serial No. 611,694 filed of even date herewith.

The following example illustrates our invention:

Example

One hundred pounds of a mixture of 1,3,4-xylenol and 1,4,2-xylenol, is thoroughly mixed with about 100–110 lbs. of metacresol. With these proportions there is a molecular excess of metacresol; which we deem desirable, although it is not essential. The mixing can be done with the ingredients cold, or preferably the mixture may be cooled after the mixing, in either case to obtain a temperature of about 0° C. to −10° C. By such cooling the addition product, metacresol-1,3,4-xylenol, usually crystallizes spontaneously from the mixture, although sometimes it is necessary to start crystallization by seeding with crystals of metacresol-1,3,4-xylenol. The crystals of metacresol-1,3,4-xylenol produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. The crystals of metacresol-1,3,4-xylenol are subjected to fractional distillation, which decomposes them into metacresol and 1,3,4-xylenol, whereupon the metacresol distills over first and then the 1,3,4-xylenol distills over. As so recovered the 1,3,4-xylenol is usually of about 90% to 95% purity.

We claim:

1. The process of separating 1,3,4-xylenol from a mixture consisting mainly of 1,3,4-xylenol and 1,4,2-xylenol, with the 1,3,4-xylenol content being at least 55%, which consists in mixing such a mixture with metacresol and producing in the resulting mixture a sufficiently low temperature to form crystals of metacresol-1,3,4-xylenol, separating such crystals, and recovering 1,3,4-xylenol in purified form from the crystals.

2. The process of separating 1,3,4-xylenol from a mixture consisting mainly of 1,3,4-xylenol and 1,4,2-xylenol, with the 1,3,4-xylenol content being at least 55%, which consists in mixing such a mixture with a molecular excess of metacresol and producing in the resulting mixture a sufficiently low temperature to form crystals of metacresol-1,3,4-xylenol, separating such crystals, and recovering 1,3,4-xylenol in purified form from the crystals.

3. The process of separating 1,3,4-xylenol from a mixture consisting mainly of 1,3,4-xylenol and 1,4,2-xylenol, with the 1,3,4-xylenol content being at least 55%, which consists in mixing such a mixture with metacresol and crystallizing metacresol-1,3,4-xylenol from the resulting mixture, separating the crystals so produced, and recovering 1,3,4-xylenol in purified form from the crystals.

4. The process of producing metacresol-1,3,4-xylenol, which consists in mixing metacresol and a mixture consisting mainly of 1,3,4-xylenol and 1,4,2-xylenol, with the 1,3,4-xylenol content being at least 55%, and producing in the resulting mixture a sufficiently low temperature to form crystals of metacresol-1,3,4-xylenol.

5. The process of producing metacresol-1,3,4-xylenol, which consists in mixing metacresol and a mixture consisting mainly of 1,3,4-xylenol and 1,4,2-xylenol, with the 1,3,4-xylenol content being at least 55%, and crystallizing metacresol-1,3,4-xylenol from the resulting mixture.

6. The process of producing 1,3,4-xylenol as set forth in claim 3, in which the 1,3,4-xylenol is recovered from the crystals of metacresol-1,3,4-xylenol by fractional distillation.

7. The process of producing 1,3,4-xylenol as set forth in claim 1, in which the temperature used to produce crystallization is at least as low as 0° C.

8. The process of producing metacresol-1,3,4-xylenol as set forth in claim 4 in which the temperature used to produce crystallization is at least as low as 0° C.

FRANCIS E. CISLAK.
MERRITT M. OTTO.

REFERENCES CITED

The following references are of record in the file of this patent:

UNITED STATES PATENTS

| Number | Name | Date |
| --- | --- | --- |
| 2,042,331 | Carswell | May 26, 1936 |